F. B. COOK.
MAIL CHUTE.
APPLICATION FILED JULY 20, 1916.
1,338,975.
Patented May 4, 1920.
4 SHEETS—SHEET 1.
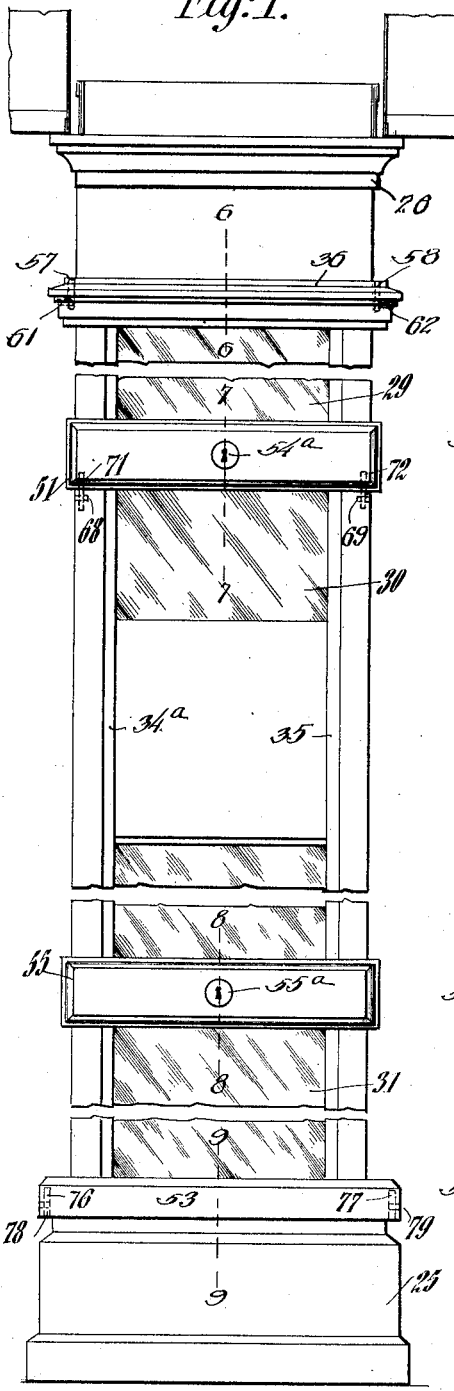
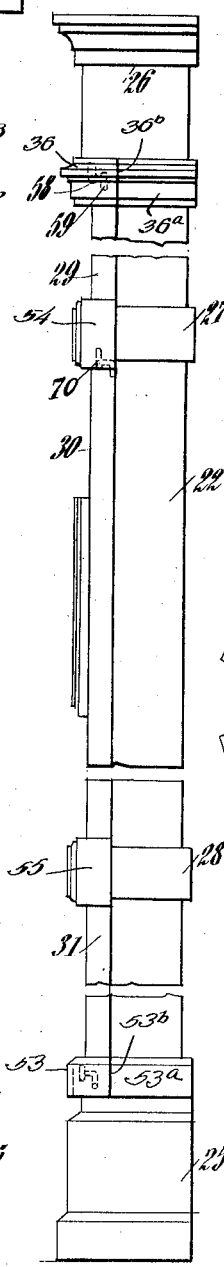
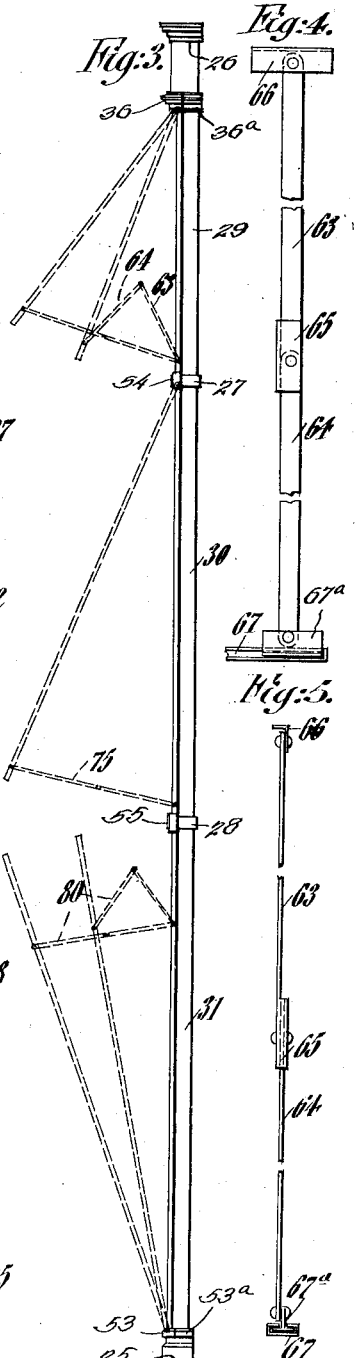
INVENTOR
Frederick B. Cook
BY Carl P. Goepel
ATTORNEY

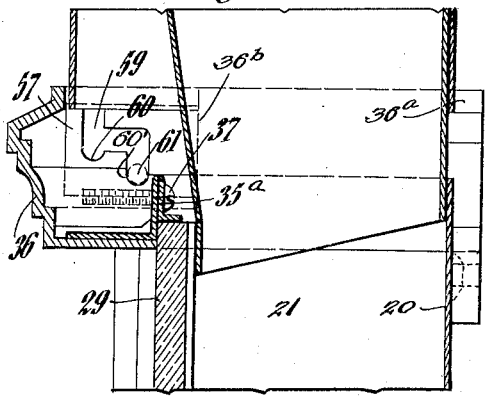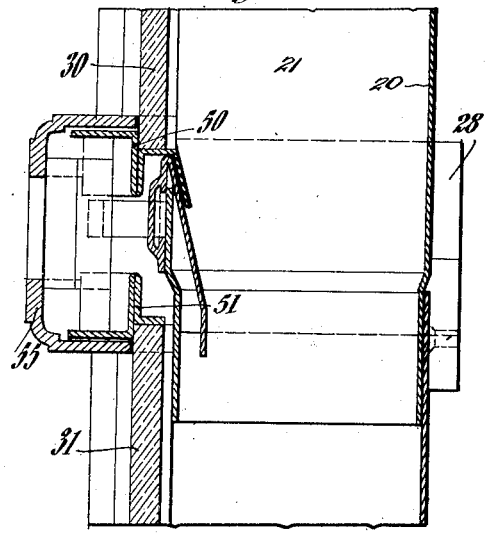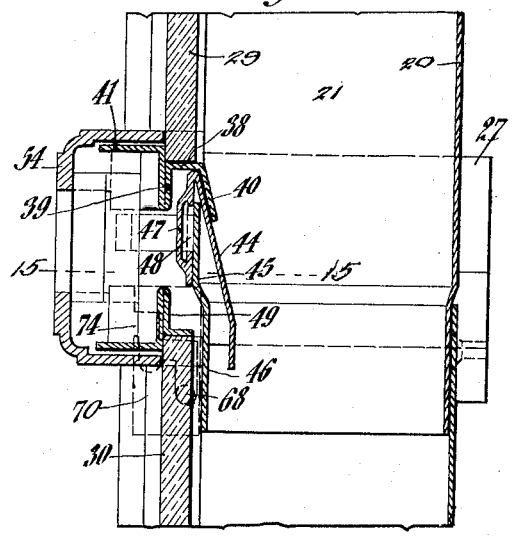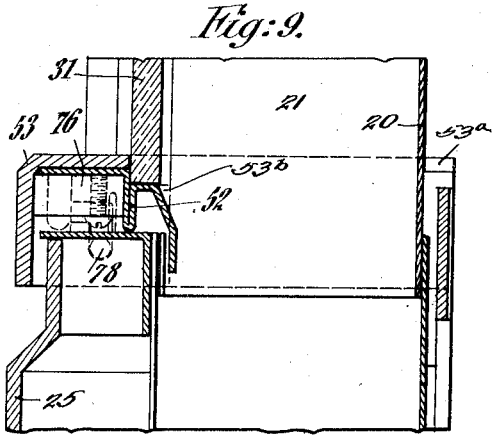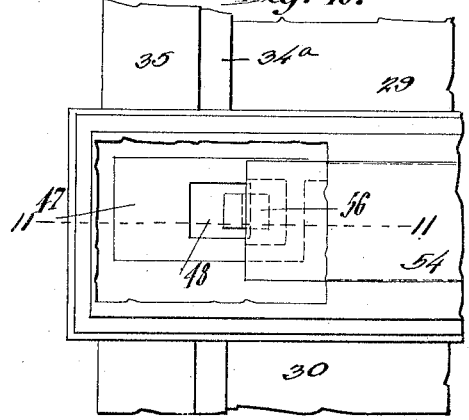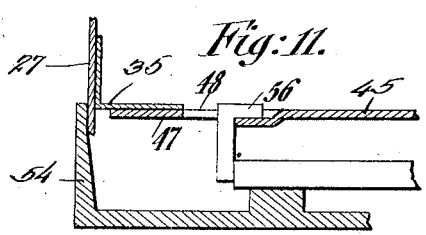

F. B. COOK.
MAIL CHUTE.
APPLICATION FILED JULY 20, 1916.

1,338,975.

Patented May 4, 1920.
4 SHEETS—SHEET 3.

INVENTOR
Frederick B. Cook
BY Carl P. Goepel
ATTORNEY

F. B. COOK.
MAIL CHUTE.
APPLICATION FILED JULY 20, 1916.
1,338,975.
Patented May 4, 1920.
4 SHEETS—SHEET 4.
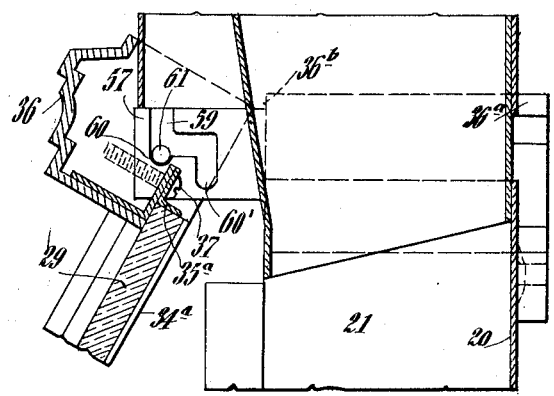
Fig:17.
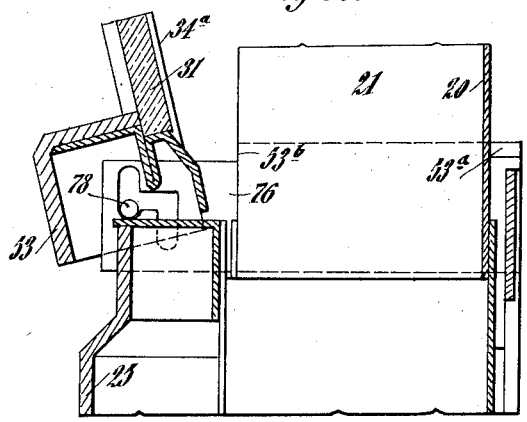
Fig:18.
INVENTOR
Frederick B. Cook
BY
ATTORNEY

UNITED STATES PATENT OFFICE.

FREDERICK B. COOK, OF NEW YORK, N. Y.

MAIL-CHUTE.

1,338,975. Specification of Letters Patent. Patented May 4, 1920.

Application filed July 20, 1916. Serial No. 110,273.

*To all whom it may concern:*

Be it known that I, FREDERICK B. COOK, a citizen of the United States, and a resident of the borough of Manhattan, in the city, county, and State of New York, have invented certain new and useful Improvements in Mail-Chutes, of which the following is a specification.

The present invention relates to improvements in mail chutes, and has for its object to provide such a chute in which the panels may be swung open into such a position as to permit access to the chute, and may if desired be removed from the chute. A further object is to provide such a device which will in no way affect the tight closing and locking of the chute, and will be simple in construction and operation.

With these and other objects in view, my invention is shown in the accompanying drawings, and will be hereinafter more fully described with reference thereto, and finally pointed out in the claims.

In the accompanying drawings,

Figure 1 is a front view of my improved chute with parts broken away,

Fig. 2 is a side view thereof,

Fig. 3 is a side view showing the chute in reduced size, extending from floor to ceiling and showing in dotted lines the open positions of the panels, Figs. 4 and 5 are side and front views respectively of the brace rod, Fig. 6 is a vertical sectional view on the line 6—6 of Fig. 1, Fig. 7 is a vertical sectional view on the line 7—7 of Fig. 1.

Figure 12:
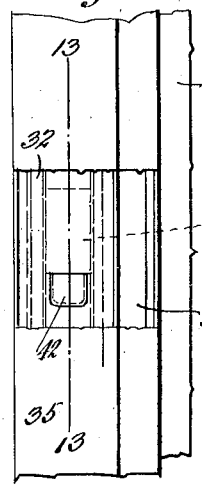
Figure 13:
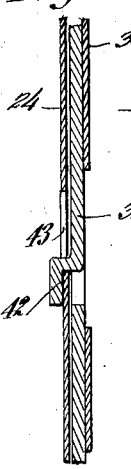
Figure 14:
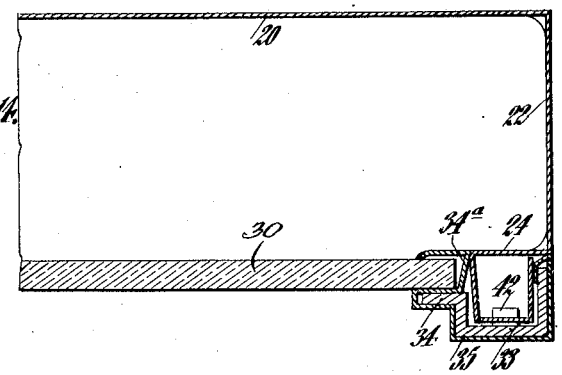
Figure 15:
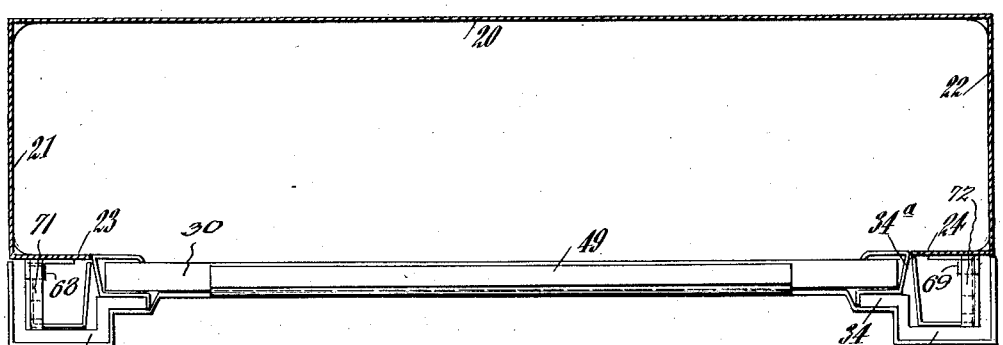
Figure 16:
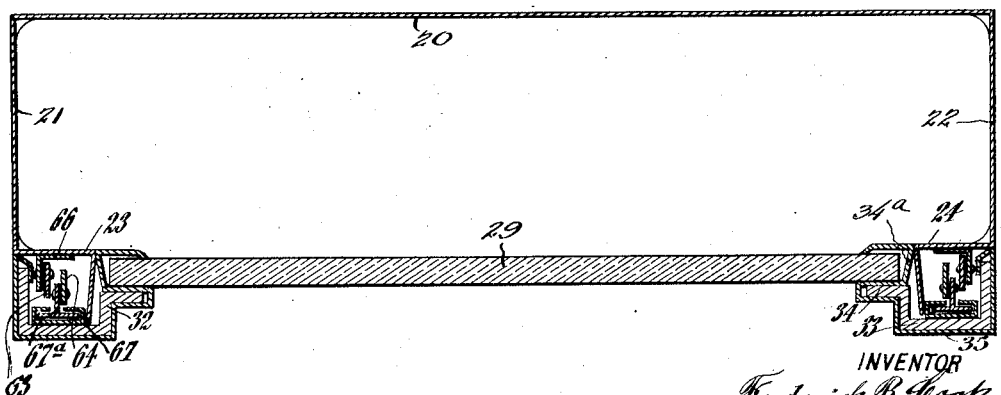

Fig. 8 is a vertical sectional view on the line 8—8 of Fig. 1,

Fig. 9 is a vertical sectional view on the line 9—9 of Fig. 1,

Fig. 10 is a front view of the locking bar with parts broken away,

Fig. 11 is a partial horizontal section of the locking bar taken on line 11—11 of Fig. 10, Fig. 12 is a front view of the panel frame, with parts broken away and showing the hooking means for mounting the panel, Fig. 13 is a vertical sectional view thereof on the line 13—13 of Fig. 12, Fig. 14 is a horizontal sectional view of the chute, showing the hooking means, Fig. 15 is a sectional view of the chute on the line 15—15 of Fig. 7 with parts omitted, Fig. 16 is a sectional view of the chute showing the brace rods, Fig. 17 is a vertical sectional view of the parts shown in Fig. 6, and with the panel swung into open position, and, Fig. 18 is a vertical sectional view of the parts shown in Fig. 9, with the panel swung into open position.

Similar reference characters indicate corresponding parts throughout the several figures of the drawings.

Referring to the drawings, my improved chute comprises a body portion consisting of a back 20, sides 21 and 22 bent forwardly therefrom, and jambs 23 and 24 at the forward edges of the sides formed by bending inwardly, forwardly and outwardly, and rearwardly as clearly shown in Fig. 14. A base 25 is provided at the floor, a cornice 26 at the ceiling, and attaching strap members 27 and 28 along the wall. The swinging and removable front of the chute comprises glass panels 29, 30 and 31, and frames inclosing the same, the said frames comprising side members formed of channel irons 32 and 33, having the inner portion thereof bent inwardly as at 34 and inclosed in a casing 35 of sheet metal, which is formed at the portion 34 into a channel 34ª, which engages and holds the glass panel. The upper and lower ends of the frame of the upper panel are shown in Figs. 6 and 7, the upper end comprising a strip 35ª L-shaped at one side, and engaging the upper edge of the glass panel and L-shaped and relatively larger at the other side, and engaging the cornice piece 36 and the front of the panel, and secured to the cornice piece by screws 37.

The lower end comprises a strip 38, which engages the lower edge of the panel, and is bent downwardly therefrom at the front and rear, as at 39 and 40, and bent upwardly from the portion 39 to engage the front of the panel, and forwardly to form a locking flange 41.

The portion 40 engages an inclined portion 44 which extends over the connecting portion 45 of the upper section of the chute, which is contracted as at 46, and extends into the next lower section, the portion 45 being formed integral with the locking projection 47, which extends inwardly from the sides of the chute, and is provided with openings 48 therein adapted to be engaged by the locking bar as hereinafter more fully pointed out. The upper and lower ends 49, 50, 51 and 52 of the two lower panels are substantially similar in form to the upper and lower ends of the upper panel, the forwardly extending portion of the lower end of the lower panel being secured to the base molding section 53. The upper end 49 is shown in plan view in Fig. 15. The channel irons 32 and 33 are provided at suitable intervals with hooks 42 stamped therefrom, which engage openings 43 provided in the jambs, the hooks becoming disengaged for removal of the panel by lifting on the latter.

Removable locking bars 54 and 55 are provided between the upper and middle panels and the middle and lower panel, and are provided with locking bolts having hooks 56 adapted to engage the openings 48 in locked position. The locking bolts are operated by means of a key in any approved manner, to cause them to slide horizontally in or out so as to engage or disengage the hooks 56 with or from the openings 48. The keyholes are shown at $54^a$, $55^a$. The locking bar engages the forwardly extending portions of the upper and lower ends of the panels, as clearly shown in Figs. 7 and 8, and prevents upward movement of the panels. The side members of the locking bar embrace the side members of the strap member 27 or 28, see Fig. 11. Upon removal of the locking bars the panels may be raised, disengaging the hooks 42, and removed from the jambs.

At the top of the chute and at each side thereof, there are provided plates 57 and 58 each having a slot 59 therein, which extends downwardly at its inner end, and upwardly at its forward end, the said upwardly extending portion being provided at its lower end with a recess 60 and being open at its upper end. Lugs 61 and 62 are provided at the upper end of the panel which engage the said slots, and in closed position rest at the lower ends or sockets 60' of the downwardly extending portions. When the panel is to be opened, the locking bar is removed, and the panel is raised disengaging the hooks 42, and raising the lugs 61 and 62 so that they may be brought forwardly into the recesses or sockets 60, whereupon the panel is supported at its upper end, and may be swung outwardly at its lower end. It will be noted (see Fig. 6) that the outer or forward sockets 60 are at a higher level than the inner or rear sockets 60', so that the hooks 42 cannot accidentally enter the slots 43 when the pins or lugs 61, 62 are seated in the sockets 60. Braces are provided at the lower end of the panel at each side thereof, and said brace comprises two rods 63 and 64 pivotally connected, one of said rods being provided with a U-shaped member 65 which extends over the other rod and holds the brace rigid when opened. As shown in Fig. 16, one end of the brace is connected to the jamb, the forward portion of the jamb being cut away, by an angular piece 66, and the other end is connected to the side of the panel by a holding member 67, which permits disengagement of the brace when desired, the brace rod being provided with a slide-piece $67^a$ which engages said holding member. The panel may thereupon be entirely removed from the chute by lifting the lugs 61 and 62 out of the open ends of the slots 59.

The middle panel is provided in a similar manner at the upper end with lugs 68 and 69 (Fig. 1), which engage slots 70 provided in plates 71 and 72 secured to the jambs, as shown in Fig. 15, the open end of the slot for permitting removal of the panel being in the front edge of the plate, as at 74 (Fig. 7). The brace rods 75 are similar to those of the upper panel.

The lower panel is supported in an opposite manner to the upper two panels, the slotted plates 76 and 77, and the lugs 78 and 79 being at the lower end, while the brace rods 80 are at the upper end. The manner of opening the chute is clearly shown in dotted lines in Fig. 3. It will be seen from Figs. 2, 3, and 9, that the base molding or base molding section 53 which is secured to the lower end of the lower panel 31, is separate from the stationary rear section $53^a$ of said molding, these two sections abutting against each other, as indicated by the vertical line $53^b$, when the parts are in their normal position. When however the lower end of the panel 31 is moved outwardly, and swings on the pins 78, 79 as a pivot axis (said pins then resting in the slot portions corresponding to those indicated by 60 in Fig. 6), the front section 53 of the base molding is moved with the lower end of the panel 31 and takes an inclined position.

It will be understood that in like manner the upper end of the upper panel 29 is movable in unison with the cornice section 36, said section being separate from the stationary rear section $36^a$ of the cornice, and the two sections abutting against each other in the normal position, as indicated by the vertical line $36^b$.

With my improved chute, access may be readily had to the interior of the chute, and without the inconvenience and danger of removing the panels. Should it be desired for any reason to remove the panels, this may be conveniently done by lifting the same from the supporting plates and disengaging the brace rods.

I have illustrated and described a preferred and satisfactory form of my invention, but it is obvious that changes may be made therein within the spirit and scope thereof, as defined in the appended claims.

I claim:

1. In a mail chute, a body portion provided with jambs having openings in their outer faces, a panel provided on its inner face with hooks adapted to enter said openings, said hooks and openings being concealed by the engagement of the faces of said jambs and panel, said panel being slidable lengthwise of the body portion to lock the hooks within said openings, or release the hooks from said openings, and means for hingedly supporting the panel when the hooks have been disengaged from said openings, the body portion and panel having converging resilient walls abutting to form a flush joint, when the panel is locked in closed position.

2. In a mail chute, a body portion and a panel adapted to be seated thereon, said body portion and panel provided with mating slot and hook formations at their seating surfaces, said panel being slidable lengthwise of the body portion to lock the panel by the engagement of the hooks within the slots, or release the panel by discharging the hooks from the slots, and means for hingedly supporting the panel when the hooks have been disengaged from said slots, the body portion and panel having converging resilient walls abutting to form a flush joint, when the panel is locked in closed position.

3. In a mail chute, a body portion provided with jambs, and a panel adapted to be fitted with its inner face against the outer surfaces of the jambs, said panel and jambs being provided on their inner and outer faces respectively, with mating slot and hook formations, said formations being concealed by the engagement of the faces of said jambs and panel, the panel being slidable lengthwise of the body portion to lock the panel by the engagement of the hooks within the slots, or release the panel by disengaging the hooks from the slots, pivot pins projecting from the panel laterally, and supporting sockets on said jambs, out of engagement with the pivot pins when the hooks are engaged with the respective slots, but arranged to receive said pins to form a hinge support for the panel, when the hooks have been disengaged from said slots, the body portion and panel having converging resilient walls abutting to form a flush joint, when the panel is locked in closed position.

4. In a mail chute, a body portion provided with jambs, and a panel provided with a channel frame adapted to be fitted with its inner face against the outer faces of said jambs, the outer surfaces of the jambs and the inner surface of the panel being provided with mating slot and hook formations, the panel being slidable lengthwise of the body portion to lock the panel by the engagement of the hooks within the slots, or release the panel by disengaging the hooks from the slots, coöperating means on the jambs and on one end of the panel, said means being out of engagement with each other when the hooks are engaged with the respective slots, but in mutual engagement to hingedly support the panel when the hooks have been disengaged from the slots, and a brace comprising strut means connected at their ends to said jambs and interiorly of said channel frame for connecting the other end of the panel with the body portion, the body portion and panel having converging resilient walls abutting to form a flush joint, when the panel is locked in closed position, said strut means being concealed within said channel frame in the engaged position of the panel with the jambs.

5. In a mail chute, a body portion and a panel provided with mating formations adapted to interlock, said panel being movable lengthwise of the body portion to lock the panel by the engagement of said formations, or release the panel by the disengagement of said formations, and a hinge-support for said panel, operative when said mating formations are disengaged, and comprising mating formations provided on the panel and on the body portion respectively and out of coöperative, hinge-forming relation while the first-named formations are in interlocking engagement.

6. In a mail chute, a body portion and a panel provided with mating formations adapted to interlock, said panel being movable lengthwise of the body portion to lock the panel by the engagement of said formations, or release the panel by the disengagement of said formations, and a hinge-support for said panel, operative when said mating formations are disengaged, and comprising pins projected from the panel laterally, sockets located on the body portion to receive said pins when said formations are in interlocking engagement, guides for said pins, leading outwardly from said sockets, and additional sockets connected with the outer portions of said guides and located at a different level from the first-named sockets, to form a hinge-support for said pins and the panel when said formations are disengaged from each other, the body portion and panel having converging resilient walls abutting to form a flush joint, when the panel is locked in closed position.

7. In a mail chute, a body portion, adjacent panels the upper one of which has its upper end hinged to the body portion, while the lower panel has its lower end hinged to the body portion, and means separable from the other ends of both of said panels and adapted to lock said other ends of said panels, the body portion and panel having converging resilient walls abutting to form a flush joint, when the panel is locked in closed position.

8. In a mail chute, a body portion, panels hinged thereto about axes transverse to the chute, and unitary means for locking the adjacent ends of two neighboring panels, the body portion and panel having converging resilient walls abutting to form a flush joint, when the panel is locked in closed position.

9. In a mail chute, a body portion, panels movable lengthwise of the chute and also hinged to the body portion about axes transverse to the chute, means, brought into play by the longitudinal movement of the panels, for locking them against pivotal movement or releasing them for such movement, and means, coöperating with two adjacent panels in their normal or closed position, to lock them against longitudinal movement in that position in which pivotal movement of the panels is prevented.

10. In a mail chute, a body portion and a panel provided with mating formations adapted to interlock, said panel being movable lengthwise of the body portion to lock the panel by the engagement of said formations, or release the panel by the disengagement of said formations, and a hinge-support for said panel, operative when said mating formations are disengaged, and comprising alining pins on said panel, sockets located on the body portion to receive said pins when said formations are in interlocking engagement, and additional sockets located on the body portion forwardly of the first-named sockets, at a higher level, and adapted to form a hinge-support for said pins and panel at the time when said formations are disengaged from each other.

11. In a mail chute, a body portion and a panel provided with mating formations adapted to interlock, said panel being movable lengthwise of the body portion to lock the panel by the engagement of said formations, or release the panel by the disengagement of said formations, and a hinge-support for said panel, operative when said mating formations are disengaged, and comprising alining pins on said panel, sockets located on the body portion to receive said pins when said formations are in interlocking engagement, and additional sockets located on the body portion forwardly of the first-named sockets, at a higher level, and adapted to form a hinge-support for said pins and panel at the time when said formations are disengaged from each other, and guides connecting those sockets which are adapted to coöperate with the same pin.

12. In a mail chute, a body portion provided with forwardly-extending jambs having recesses, a forwardly-movable panel having longitudinal channeled portions open rearwardly and straddling or embracing said jambs, and braces connected with the panel and with the body portion and adapted to fold into the recesses of the jambs.

13. In a mail chute, a body portion, a forwardly-movable panel having longitudinal channeled portions open rearwardly, and braces connected with the panel and with the body portion and adapted to fold into the channeled portions of the panel.

14. In a mail chute, a body portion and a panel provided with mating formations adapted to interlock, said panel being movable lengthwise of the body portion to lock the panel by the engagement of said formations, or release the panel by the disengagement of said formations, and a hinge-support for said panel, operative when said mating formations are disengaged, and comprising pins projected from the panel laterally, a pair of sockets located on the body portion to receive said pins when said formations are in interlocking engagement, another pair of sockets located on the body portion forwardly of the first-named pair and adapted to form a hinge-support for said pins and panel at a time when said formations are disengaged from each other, guides for said pins, leading from one pair of sockets to the other, and open-end guides for said pins, leading from the forward pair of sockets and enabling the panel to be detached from the body portion.

In testimony, that I claim the foregoing as my invention, I have signed my name in presence of two subscribing witnesses.

FREDERICK B. COOK.

Witnesses:
F. M. ROESCH,
R. C. BARSCH.